US012560557B2

(12) United States Patent
Iga

(10) Patent No.: US 12,560,557 B2
(45) Date of Patent: Feb. 24, 2026

(54) INSPECTION METHOD OF WORKPIECE AND INSPECTION APPARATUS

(71) Applicant: DISCO CORPORATION, Tokyo (JP)

(72) Inventor: Hayato Iga, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 293 days.

(21) Appl. No.: 18/467,871

(22) Filed: Sep. 15, 2023

(65) Prior Publication Data

US 2024/0094143 A1     Mar. 21, 2024

(30) Foreign Application Priority Data

Sep. 20, 2022     (JP) ................................. 2022-149086

(51) Int. Cl.
| | |
|---|---|
| *G01N 21/95* | (2006.01) |
| *B23K 26/08* | (2014.01) |
| *B23K 26/53* | (2014.01) |
| *G01N 21/17* | (2006.01) |
| *G01N 21/88* | (2006.01) |
| *B23K 103/00* | (2006.01) |

(52) U.S. Cl.
CPC ....... *G01N 21/9505* (2013.01); *B23K 26/083* (2013.01); *B23K 26/0869* (2013.01); *B23K 26/53* (2015.10); *G01N 21/17* (2013.01); *G01N 21/8806* (2013.01); *B23K 2103/56* (2018.08); *G01N 2021/1736* (2013.01); *G01N 2201/021* (2013.01)

(58) Field of Classification Search
CPC .............. G01N 21/9505; G01N 21/17; G01N 21/8806; G01N 2021/1736; G01N 2201/021; B23K 26/53; B23K 26/083; B23K 26/0869; B23K 2103/56

See application file for complete search history.

(56) References Cited

U.S. PATENT DOCUMENTS

2023/0364717 A1* 11/2023 Yamamoto ......... B23K 26/0006

FOREIGN PATENT DOCUMENTS

| | | |
|---|---|---|
| JP | 09262826 A | 10/1997 |
| JP | 2018147928 A | 9/2018 |
| JP | 2021068819 A | 4/2021 |
| JP | 2022025566 A | 2/2022 |

* cited by examiner

*Primary Examiner* — Georgia Y Epps
*Assistant Examiner* — Don J Williams
(74) *Attorney, Agent, or Firm* — Greer Burns & Crain Ltd.

(57) ABSTRACT

An inspection method of a workpiece includes a separation layer forming step of forming a separation layer composed of a modified layer parallel to an upper surface and cracks that extend from the modified layer inside the workpiece, an irradiation step of irradiating the whole of the upper surface of the workpiece in which the separation layer has been formed with light with such a wavelength as to be transmitted through the workpiece and reflect at the crack of the separation layer after the separation layer forming step is executed, a light reception step of receiving reflected light resulting from the irradiation in the irradiation step and reflection by the crack, and a determination step of determining the state of the separation layer on the basis of the intensity of the reflected light received in the light reception step.

11 Claims, 10 Drawing Sheets

INSPECTION METHOD OF WORKPIECE AND INSPECTION APPARATUS

BACKGROUND OF THE INVENTION

Field of the Invention

The present invention relates to an inspection method of a workpiece composed of single-crystal silicon and an inspection apparatus.

Description of the Related Art

A wire saw is known as means that cuts out a wafer from a silicon ingot, a compound semiconductor ingot, or the like. The wire saw is what has a wire row formed by winding a large number of turns of a wire for cutting around multiple rollers and executes cutting at wire positions by executing cutting-in feed of this wire for cutting into an ingot (for example, refer to Japanese Patent Laid-open No. Hei 09-262826). However, the cutting allowance of the wire saw is as comparatively large as approximately 300 µm. Furthermore, lapping, etching, or polishing needs to be executed in order to planarize the surface after cutting. Therefore, there is a problem that the amount of material used as wafers is approximately ⅓ of the material amount of the original ingot and the productivity is low.

Thus, a technique has been devised in which a separation layer composed of modified parts and cracks is formed inside an ingot by irradiating the ingot with a laser beam and a wafer is separated from the ingot with this separation layer being the point of origin (refer to Japanese Patent Laid-open No. 2022-025566). This makes it possible to significantly reduce material loss compared with the wire saw. However, it has been revealed that there is the case in which it is impossible to separate a wafer due to insufficiency of formation of the separation layer or separation treatment (giving of ultrasonic waves or the like) when the wafer is separated with the separation layer being the point of origin.

Thus, methods have been devised in which a separation layer formed inside an ingot is detected by irradiating the ingot with light in order to identify a region in which the separation layer has not been formed and additionally execute processing treatment or separation treatment (refer to Japanese Patent Laid-open No. 2021-068819 and Japanese Patent Laid-open No. 2018-147928).

SUMMARY OF THE INVENTION

However, in the method of Japanese Patent Laid-open No. 2021-068819, a collecting lens and a separation layer detecting unit are disposed adjacent to each other along a direction parallel to a processing feed direction and thus a region that is impossible to detect at the timing of the end of laser processing occurs. Therefore, there arises the need to make an overrun of the collecting lens and the separation layer detecting unit in order to detect the separation layer although processing has ended, and there is a fear that lowering of the productivity is caused in association with increase in the diameter of the ingot and so forth. Furthermore, in the method of Japanese Patent Laid-open No. 2018-147928, the state of the separation layer generated inside an ingot is determined by using the generally-called principle of the magic mirror. However, there is a problem that the determination is susceptible to the influence of a saw mark in an ingot surface.

Thus, an object of the present invention is to provide an inspection method of a workpiece and an inspection apparatus that enable determination of a separation layer formed inside an ingot without lowering the productivity and without suffering from the influence of a saw mark.

In accordance with an aspect of the present invention, there is provided an inspection method of a workpiece composed of single-crystal silicon manufactured in such a manner that a specific crystal plane is exposed in each of an upper surface and a lower surface. The inspection method of a workpiece includes a separation layer forming step of forming a separation layer including a modified layer parallel to the upper surface and cracks that extend from the modified layer inside the workpiece through positioning the focal point of a laser beam with a wavelength having transmissibility with respect to the workpiece to a depth equivalent to a thickness of a wafer to be manufactured from the upper surface of the workpiece and executing irradiation with the laser beam while relatively moving the focal point and the workpiece in a processing feed direction. The inspection method of a workpiece includes also an irradiation step of irradiating the whole of the upper surface of the workpiece in which the separation layer has been formed with light having such a wavelength as to be transmitted through the workpiece and reflect at the crack of the separation layer after the separation layer forming step is executed, a light reception step of receiving reflected light resulting from the irradiation in the irradiation step and reflection by the crack, and a determination step of determining a state of the separation layer on the basis of the intensity of the reflected light received in the light reception step.

Preferably, the inspection method of a workpiece further includes a separation step of giving an external force to the workpiece and separating the wafer from the workpiece with the separation layer being a point of origin when it is determined that the cracks adjacent in the separation layer connect to each other in the determination step. Furthermore, in the determination step, whether or not the cracks adjacent in the separation layer have been formed to connect to each other is determined depending on whether or not the intensity of the reflected light is larger than a first predetermined value.

Preferably, a separation step of giving an external force to the workpiece and separating the wafer from the workpiece with the separation layer being a point of origin is executed after the separation layer forming step is executed. Preferably, the irradiation step, the light reception step, and the determination step are executed again when the separation of the wafer from the workpiece has not succeeded in the separation step.

Preferably, in the determination step, whether or not the wafer has been separated from the workpiece with the separation layer being the point of origin is determined depending on whether or not the intensity of the reflected light is larger than a second predetermined value larger than the first predetermined value that is a criterion of determination of whether or not the cracks adjacent in the separation layer have been formed to connect to each other.

Preferably, in the separation layer forming step, the separation layer including a plurality of modified layers and cracks is formed inside the workpiece by alternately executing a laser beam irradiation step of executing irradiation with the laser beam while relatively moving the focal point of the laser beam and the workpiece along a direction parallel to a crystal orientation <100> to form the modified layer parallel to the upper surface and the cracks that extend from the modified layer inside the workpiece and an indexing feed step of executing indexing feed of the focal point of the laser beam and the workpiece relatively in a direction orthogonal to a direction along which the modified layer has been formed in the laser beam irradiation step.

Preferably, the light with which irradiation is executed in the irradiation step is applied to the upper surface of the workpiece at a predetermined angle of incidence from a direction that includes the processing feed direction and is parallel to a plane perpendicular to the upper surface of the workpiece.

In accordance with another aspect of the present invention, there is provided an inspection apparatus that inspects a separation layer of a workpiece inside which the separation layer composed of a modified layer and cracks that extend from the modified layer is formed through irradiation of the workpiece composed of single-crystal silicon manufactured in such a manner that a specific crystal plane is exposed in each of an upper surface and a lower surface with a laser beam with a wavelength having transmissibility from the side of the upper surface. The inspection apparatus includes a holding table that holds the workpiece with the side of the upper surface of the workpiece exposed, a light source that irradiates the whole of the upper surface of the workpiece held by the holding table with light having such a wavelength as to be transmitted through the workpiece and reflect at the crack, a light receiving unit that receives reflected light resulting from the irradiation of the whole of the upper surface of the workpiece by the light source and reflection at the crack included in the separation layer, and a determining unit that determines a state of the separation layer on the basis of the intensity of the reflected light received by the light receiving unit.

Preferably, the determining unit determines whether or not the cracks adjacent in the separation layer have been formed to connect to each other depending on whether or not the intensity of the reflected light is larger than a first predetermined value.

Preferably, the determining unit determines whether or not a wafer has been separated from the workpiece with the separation layer being a point of origin depending on whether or not the intensity of the reflected light is larger than a second predetermined value larger than a first predetermined value that is a criterion of determination of whether or not the cracks adjacent in the separation layer have been formed to connect to each other.

Preferably, the separation layer including the modified layer parallel to the upper surface and the cracks that extend from the modified layer is formed in the workpiece through irradiation of the workpiece with the laser beam along a direction parallel to a crystal orientation <100>, and the light source is disposed at such a position as to be capable of irradiating the upper surface of the workpiece with the light at a predetermined angle of incidence from a direction that includes a processing feed direction that is the direction along which irradiation with the laser beam has been executed and is parallel to a plane perpendicular to the upper surface of the workpiece.

Preferably, at least two light sources are disposed as the light source.

The present invention determines the state of the separation layer inside the workpiece by irradiating the whole of the upper surface of the workpiece with the light with such a wavelength as to be transmitted through the workpiece and be reflected at the separation layer and observing the intensity of the reflected light reflected at the separation layer. Thus, it is possible to determine the state of the separation layer through only irradiating the whole of the upper surface of the workpiece with the light one time. Therefore, it becomes possible to determine the separation layer in a short time without lowering the productivity irrespective of the size of the workpiece.

Moreover, the present invention can determine, based on the intensity of the reflected light, the formation status of the separation layer, more specifically, whether or not the adjacent cracks connect to each other, whether or not the connected cracks spread and separation has occurred between the ingot side and the wafer side of the workpiece, and so forth. Therefore, the state of the separation layer can be determined without suffering from the influence of a saw mark.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Embodiments of the present invention will be described in detail below with reference to the drawings. The present invention is not limited by contents described in the following embodiments. Furthermore, what can be easily envisaged by those skilled in the art and what are substantially the same are included in constituent elements described below. Moreover, configurations described below can be combined as appropriate. In addition, various kinds of omission, replacement, or change of a configuration can be carried out without departing from the gist of the present invention.

First Embodiment

Figures 1, 2:
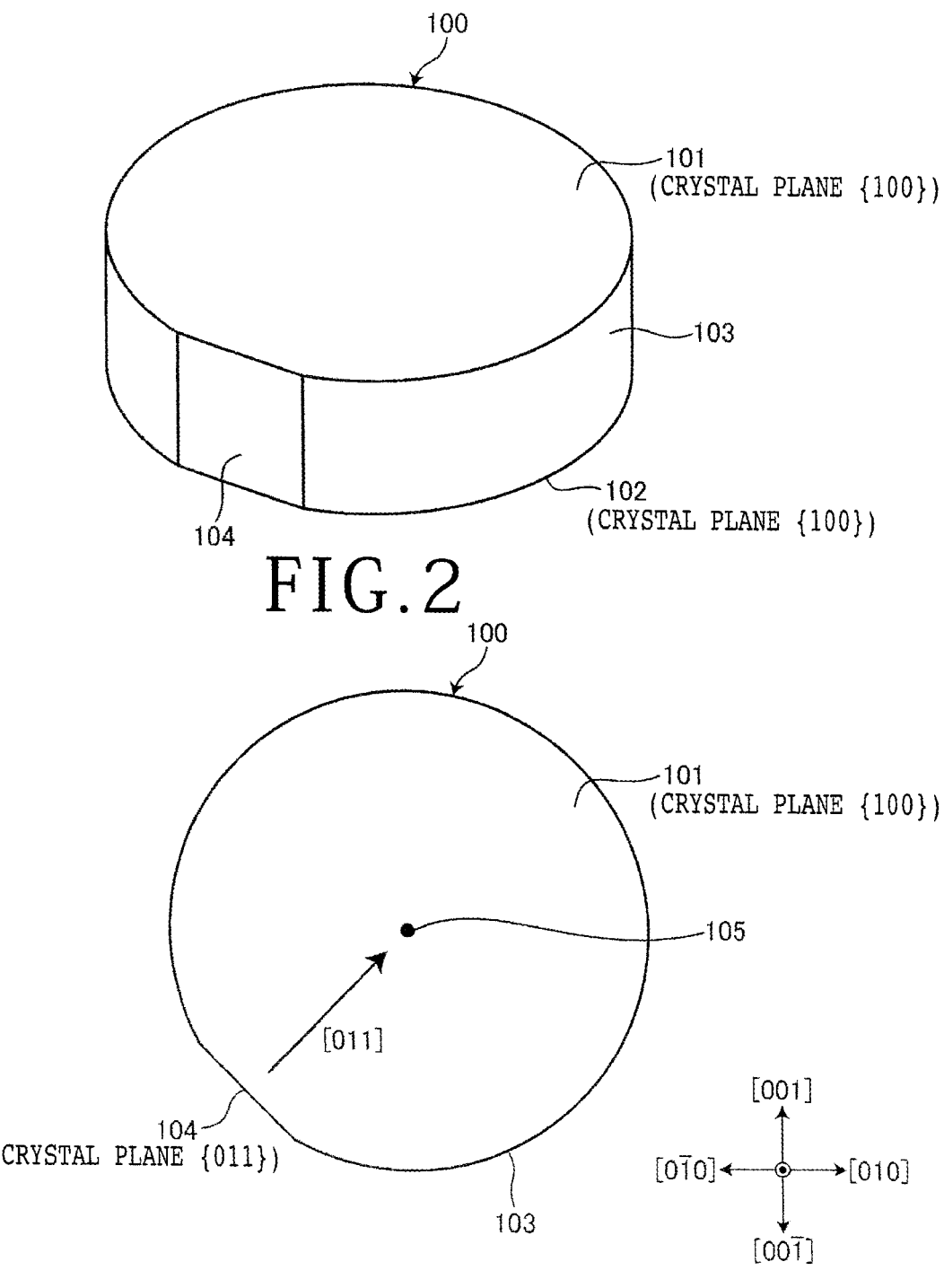
FIG. 1 is a perspective view illustrating one example of a workpiece that is an inspection target of an inspection method of a workpiece and inspection an apparatus according to a first embodiment.
FIG. 2 is a top view illustrating the workpiece of FIG. 1.

An inspection method of a workpiece and pieces of an inspection apparatus 1 and 1-2 according to a first embodiment of the present invention will be described based on drawings. FIG. 1 is a perspective view illustrating one example of a workpiece 100 that is an inspection target of the inspection method of a workpiece and the pieces of the inspection apparatus 1 and 1-2 according to the first embodiment. FIG. 2 is a top view illustrating the workpiece 100 of FIG. 1. As illustrated in FIG. 1, the workpiece 100 is a silicon (Si) ingot composed of single-crystal silicon manufactured in such a manner that a specific crystal plane included in the crystal plane {100} is exposed in each of an upper surface 101 and a lower surface 102. As illustrated in FIG. 1 and FIG. 2, in the first embodiment, the workpiece 100 is formed into a circular column shape as a whole and has the upper surface 101 that is formed by employing the specific crystal plane included in the crystal plane {100} as a flat surface and has a circular shape, the lower surface 102 that is on the opposite side to the upper surface 101 and is formed by employing the same specific crystal plane as the upper surface 101 as a flat surface and has a circular shape, and a circumferential surface 103 located between the upper surface 101 and the lower surface 102. In the first embodiment, as illustrated in FIG. 2, the specific crystal plane {100} included in the crystal plane {100} is employed as the flat surface for the upper surface 101 and the lower surface 102. However, the upper surface 101 and the lower surface 102 are not limited thereto in the present invention and the crystal plane (010) or the crystal plane (001) may be employed as the flat surface.

As illustrated in FIG. 1 and FIG. 2, a flat rectangular orientation flat 104 is formed in the circumferential surface 103 of the workpiece 100. In the first embodiment, as illustrated in FIG. 2, the orientation flat 104 is formed in parallel to the crystal plane (011) at such a position that a center axis 105 of the workpiece 100 exists in the direction of the crystal orientation [011] as viewed from the orientation flat 104. The workpiece 100 is not limited thereto in the present invention and a notch that extends in the axial direction may be formed at a similar position in the circumferential surface 103 instead of the orientation flat 104.

Figure 3:
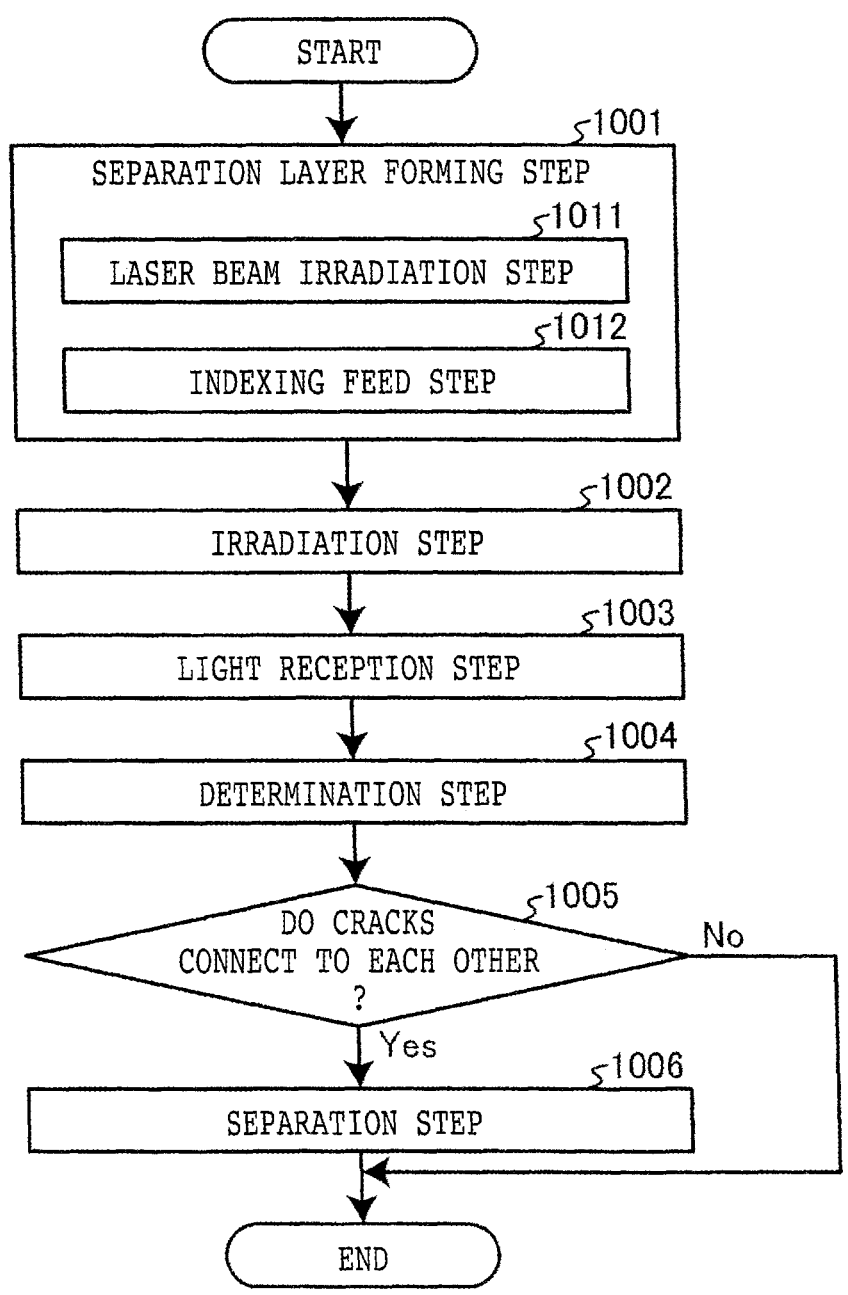
FIG. 3 is a flowchart illustrating the processing procedure of the inspection method of a workpiece according to the first embodiment.

Next, the present specification will explain the inspection method of a workpiece according to the first embodiment on the basis of drawings. FIG. 3 is a flowchart illustrating the processing procedure of the inspection method of a workpiece according to the first embodiment. The inspection method of a workpiece according to the first embodiment is a method for inspecting the workpiece 100 and includes a separation layer forming step 1001, an irradiation step 1002, a light reception step 1003, a determination step 1004, and a separation step 1006.

Figure 4:
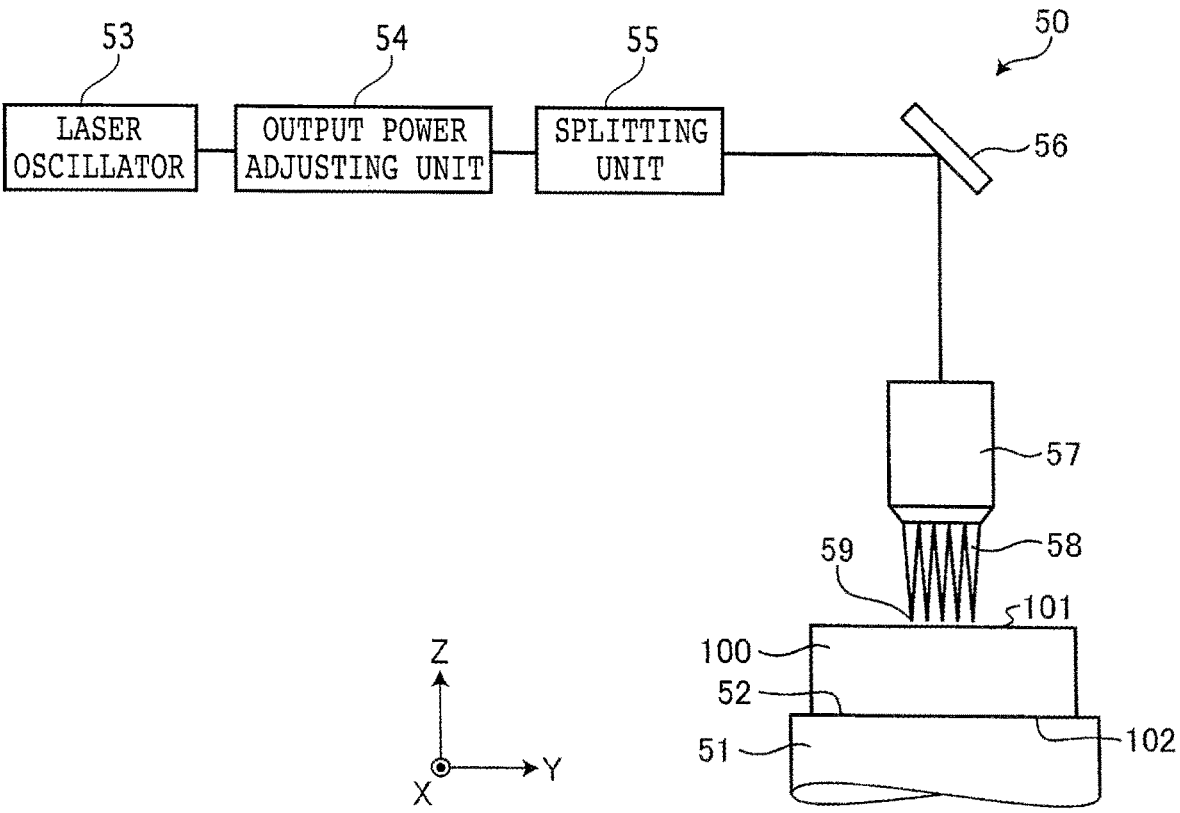
FIG. 4 is a side view illustrating a separation layer forming step in FIG. 3.
Figure 5:
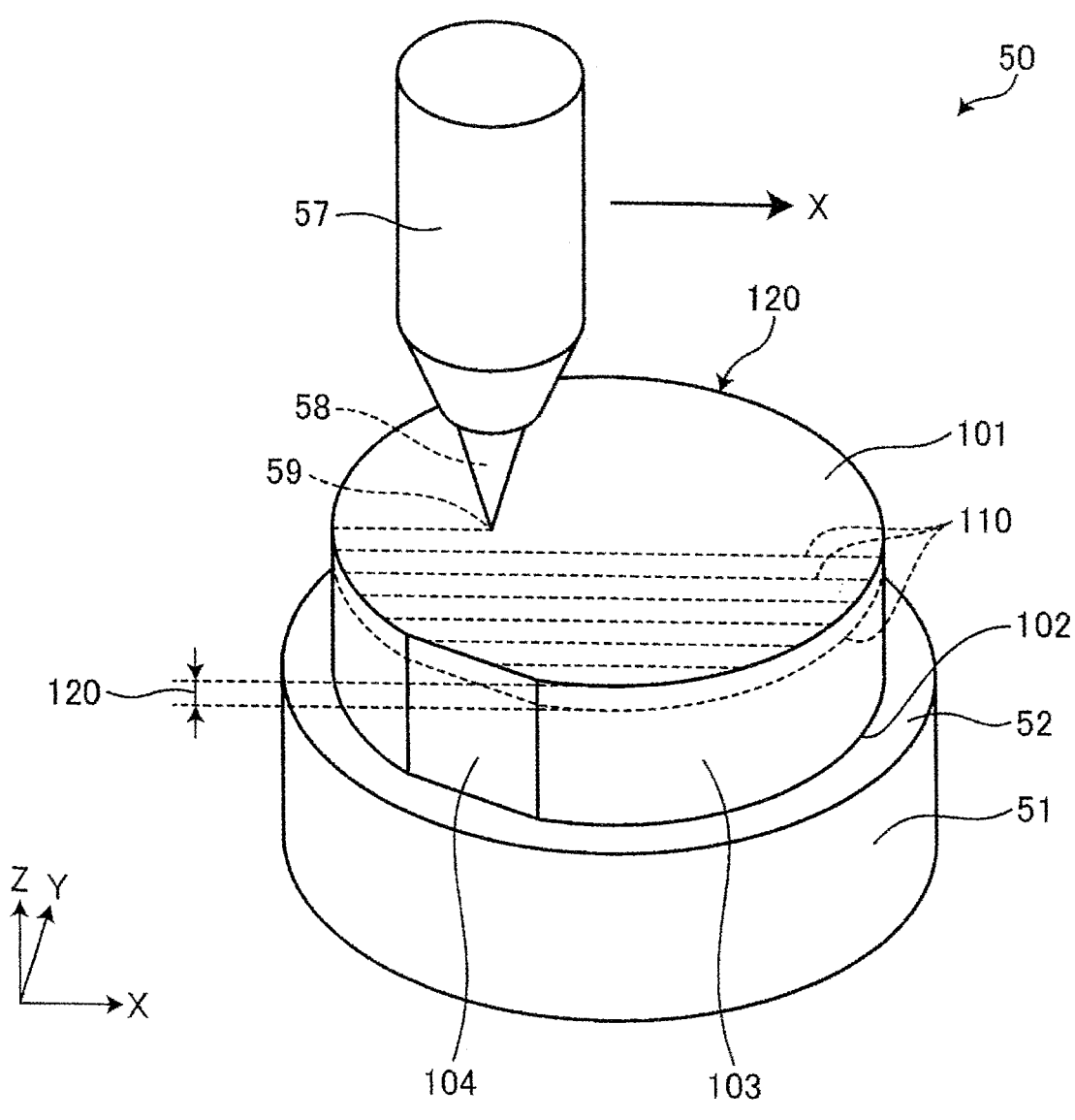
FIG. 5 is a perspective view illustrating the separation layer forming step in FIG. 3.

FIG. 4 and FIG. 5 are a sectional view and a perspective view, respectively, for explaining the separation layer forming step 1001 in FIG. 3. As illustrated in FIG. 4 and FIG. 5, the separation layer forming step 1001 is a step of forming a separation layer 110 including modified layers parallel to the upper surface 101 and cracks that extend from the modified layers inside the workpiece 100 through positioning focal points 59 of laser beams 58 with a wavelength having transmissibility with respect to the workpiece 100 to a depth 120 equivalent to the thickness of a wafer to be manufactured from the upper surface 101 of the workpiece

100 and executing irradiation with the laser beams 58 while relatively moving the focal points 59 and the workpiece 100 in a processing feed direction.

In the first embodiment, the separation layer forming step 1001 is executed by a laser processing apparatus 50 illustrated in FIG. 4 and FIG. 5. As illustrated in FIG. 4 and FIG. 5, the laser processing apparatus 50 includes a holding table 51 that holds the workpiece 100 by a holding surface 52, a laser oscillator 53, an output power adjusting unit 54, a splitting unit 55, a mirror 56, a light collector 57, a movement unit that is not illustrated, and a controller that is not illustrated.

For example, the holding table 51 is a chuck table that sucks and holds the workpiece 100 by the holding surface 52 from the side of the lower surface 102 with the side of the upper surface 101 exposed. The laser oscillator 53 emits the laser beam 58 with a wavelength having transmissibility with respect to the workpiece 100. The output power adjusting unit 54 adjusts the output power of the laser beam 58 emitted by the laser oscillator 53. The splitting unit 55 splits the laser beam 58 whose output power has been adjusted by the output power adjusting unit 54 into multiple (in the example illustrated in FIG. 4, five) laser beams with the interposition of predetermined intervals in a Y-axis direction. The mirror 56 reflects the multiple laser beams 58 split by the splitting unit 55 to change the optical path thereof. The light collector 57 focuses the multiple laser beams 58 reflected by the mirror 56 and irradiates the workpiece 100 with the multiple laser beams 58. The movement unit relatively moves the holding table 51 and the workpiece 100 held by the holding table 51 and the light collector 57 and the focal points 59 of the multiple laser beams 58 formed by the light collector 57 along the processing feed direction and an indexing feed direction. Here, in the first embodiment, the processing feed direction is an X-axis direction of the laser processing apparatus 50 and the indexing feed direction is the Y-axis direction of the laser processing apparatus 50. The controller of the laser processing apparatus 50 controls operation of the respective constituent elements of the laser processing apparatus 50 and causes the laser processing apparatus 50 to execute the separation layer forming step 1001. The controller of the laser processing apparatus 50 includes a computer system similar to one of a controller of the inspection apparatus 1 to be described later.

In the separation layer forming step 1001, first, the controller of the laser processing apparatus 50 conveys the workpiece 100 onto the holding table 51 by a conveying unit that is not illustrated and so forth and holds the workpiece 100 by the holding table 51. In the separation layer forming step 1001, next, the controller of the laser processing apparatus 50 aligns a specific crystal orientation that is parallel to the upper surface 101 of the workpiece 100 held by the holding table 51 and is included in the crystal orientation <100> with the processing feed direction through rotating the holding table 51 around a Z-axis, or the like. In the first embodiment, the controller of the laser processing apparatus 50 aligns the specific crystal orientation [010] of the workpiece 100 with the processing feed direction. However, the configuration is not limited thereto in the present invention and the specific crystal orientation [001] of the workpiece 100 may be aligned with the processing feed direction.

In the first embodiment, the separation layer forming step 1001 includes a laser beam irradiation step 1011 and an indexing feed step 1012 as illustrated in FIG. 3. In the separation layer forming step 1001, after the workpiece 100 is held by the holding table 51 and the specific crystal orientation of the workpiece 100 is aligned with the processing feed direction, the separation layer 110 including multiple modified layers and cracks are formed inside the workpiece 100 by alternately executing the laser beam irradiation step 1011 and the indexing feed step 1012.

The laser beam irradiation step 1011 is a step in which the controller of the laser processing apparatus 50 executes irradiation with the laser beams 58 by the light collector 57 while moving, by the movement unit, the focal points 59 of the laser beams 58 and the workpiece 100 along the processing feed direction, that is, a direction parallel to the specific crystal orientation (in the first embodiment, crystal orientation [010]) that is parallel to the upper surface 101 of the workpiece 100 and is included in the crystal orientation <100>, to form the modified layer parallel to the upper surface 101 and cracks that extend from the modified layer inside the workpiece 100. When the workpiece 100 is irradiated with the laser beams 58 in the laser beam irradiation step 1011, along a line parallel to the processing feed direction along which the irradiation with the laser beams 58 is executed, the modified layer parallel to the upper surface 101 is formed in the vicinity of the focal points 59 of the laser beams 58 and cracks that extend along a direction parallel to the upper surface 101 are formed from both sides of the modified layer. The modified layer is a region in which the density, the refractive index, the mechanical strength, or another physical property has become a state different from that of the surroundings, for example.

The indexing feed step 1012 is a step in which the controller of the laser processing apparatus 50 executes, by the movement unit, indexing feed of the focal points 59 of the laser beams 58 and the workpiece 100 relatively in the indexing feed direction, that is, the direction orthogonal to the direction along which the modified layer has been formed in the laser beam irradiation step 1011.

In the workpiece 100, by alternately executing the laser beam irradiation step 1011 and the indexing feed step 1012, the modified layers parallel to the upper surface 101 are formed in the vicinity of the focal points 59 of the laser beams 58 along multiple lines parallel to the processing feed direction and cracks that extend from the modified layers formed along adjacent lines connect to each other. This makes it possible to separate, in the workpiece 100, a wafer that includes the upper surface 101 and has a thickness equivalent to the depth 120 with the separation layer 110 including these modified layers and cracks being the point of origin by giving a predetermined external force.

Figure 6:
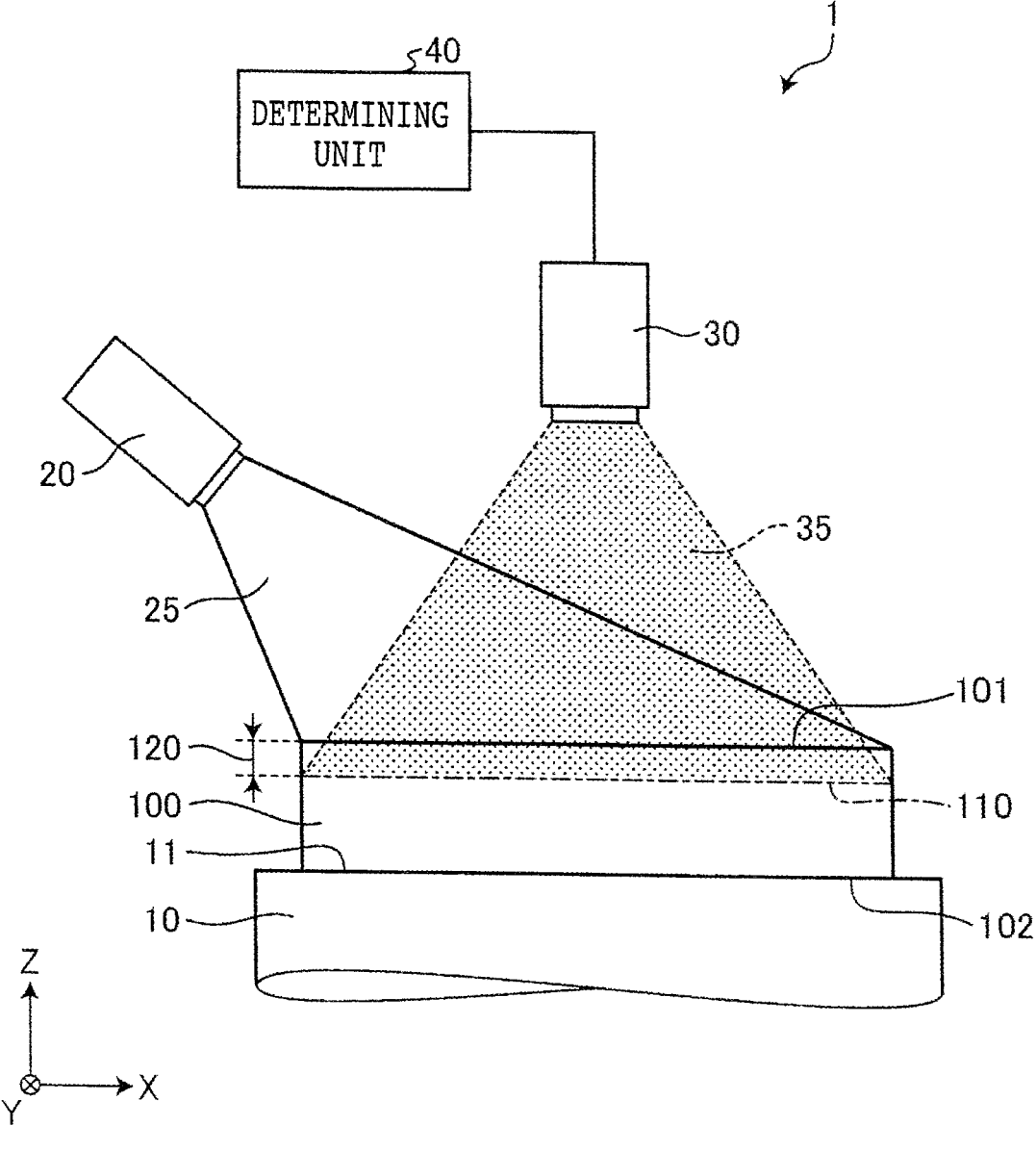
FIG. 6 is a side view illustrating a configuration example of the inspection apparatus and one example of an irradiation step and a light reception step in FIG. 3 according to the first embodiment.
Figure 7:
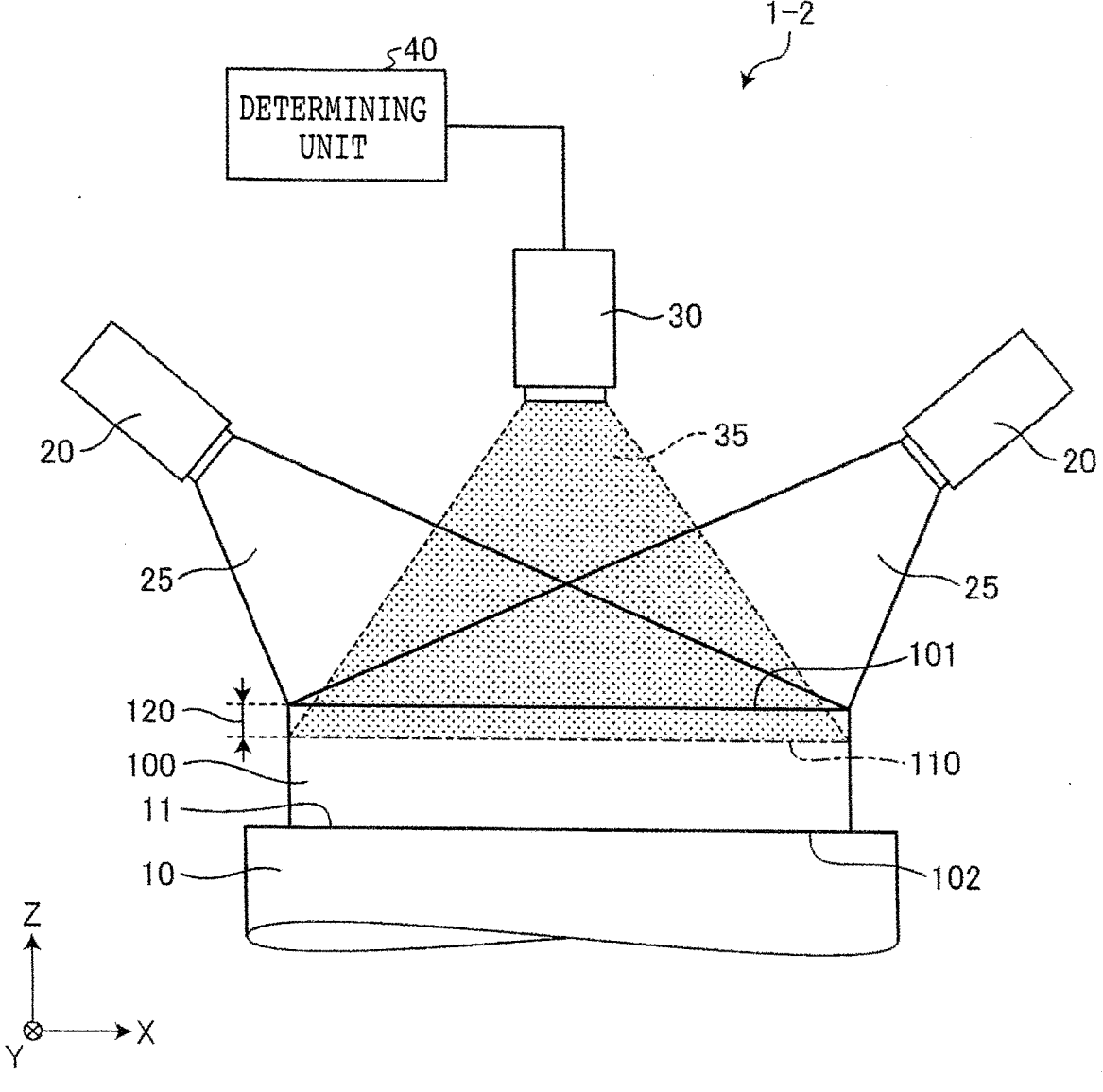
FIG. 7 is a side view illustrating another configuration example of the inspection apparatus and another example of the irradiation step and the light reception step in FIG. 3 according to the first embodiment.
Figure 8:
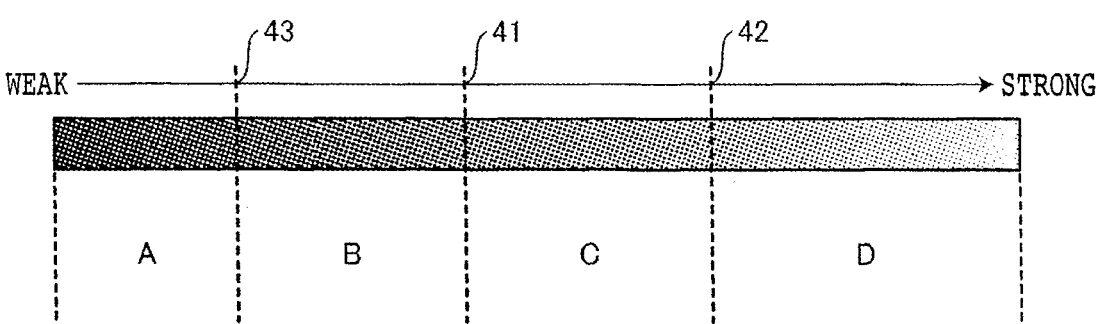
FIG. 8 is a diagram illustrating a determination step in FIG. 3.
Figure 9:
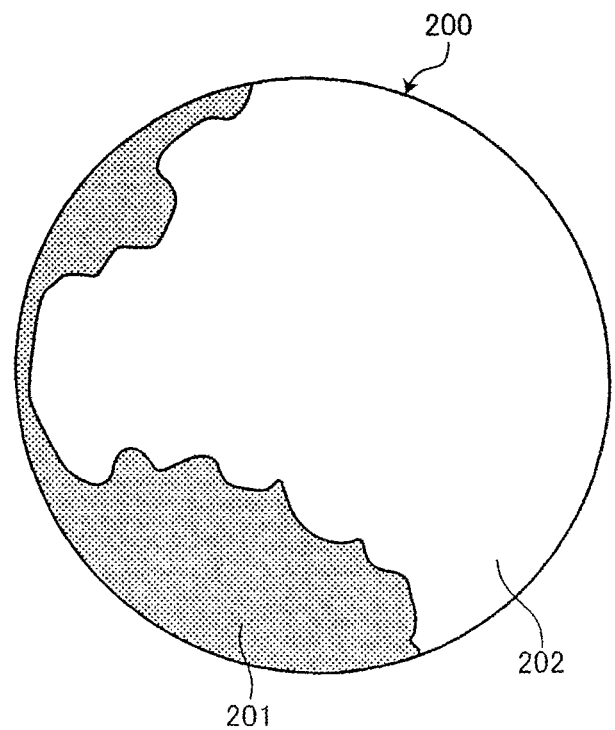
FIG. 9 is a plan view illustrating one example of the determination step in FIG. 3.

FIG. 6 is a sectional view for explaining a configuration example of the inspection apparatus 1 and one example of the irradiation step 1002 and the light reception step 1003 in FIG. 3 according to the first embodiment. FIG. 7 is a sectional view for explaining a configuration example of the inspection apparatus 1-2 and another example of the irradiation step 1002 and the light reception step 1003 in FIG. 3 according to the first embodiment. FIG. 8 is a diagram for explaining the determination step 1004 in FIG. 3. FIG. 9 is a plan view illustrating one example of the determination step 1004 in FIG. 3. In the first embodiment, the irradiation step 1002, the light reception step 1003, and the determination step 1004 are executed by the inspection apparatus 1 according to the first embodiment illustrated in FIG. 6 or the inspection apparatus 1-2 according to the first embodiment illustrated in FIG. 7.

The inspection apparatus 1 according to the first embodiment is an apparatus that inspects the separation layer 110 of the workpiece 100 inside which the separation layer 110 composed of the modified layers and the cracks that extend from the modified layers has been formed through irradiation of the workpiece 100 composed of single-crystal silicon manufactured in such a manner that a specific crystal plane included in the crystal plane {100} is exposed in each of the upper surface 101 and the lower surface 102 with the laser beams 58 with a wavelength having transmissibility from the side of the upper surface 101, and is an apparatus that executes the irradiation step 1002, the light reception step 1003, and the determination step 1004 in the inspection method of a workpiece according to the first embodiment. As illustrated in FIG. 6, the inspection apparatus 1 according to the first embodiment includes a holding table 10, a light source 20, a light receiving unit 30, a determining unit 40, a cover that is not illustrated, and a display unit that is not illustrated.

The holding table 10 holds the workpiece 100 with the side of the upper surface 101 of the workpiece 100 exposed. In the first embodiment, the holding table 10 is a generally-called chuck table including a circular disc-shaped frame body in which a concave part is formed and a suction adhesion part that is fitted into the concave part and has a circular disc shape. The suction adhesion part of the holding table 10 is formed of a porous ceramic or the like having a large number of porous holes and is connected to a vacuum suction source that is not illustrated through a vacuum suction path that is not illustrated. The upper surface of the suction adhesion part of the holding table 10 is a holding surface 11 on which the workpiece 100 is placed as illustrated in FIG. 6 and that sucks and hold the placed workpiece 100 by a negative pressure introduced from the vacuum suction source. In the first embodiment, the workpiece 100 is placed on the holding surface 11 with the upper surface 101 oriented upward and the holding surface 11 sucks and holds the placed workpiece 100 from the side of the lower surface 102. The holding surface 11 and the upper surface of the frame body of the holding table 10 are disposed on the same plane and are formed in parallel to the XY-plane, which is a horizontal plane.

The holding table 10 is disposed to be capable of rotating by a rotational drive source that is not illustrated around the axial center parallel to a Z-axis direction that is the vertical direction and is perpendicular to the holding surface 11. In the first embodiment, the holding table 10 can align the processing feed direction that is the direction along which the workpiece 100 has been irradiated with the laser beams 58 with an X-axis direction of the inspection apparatus 1 in the workpiece 100 held by the holding table 10 by rotating by the rotational drive source. The processing feed direction that is the direction along which the workpiece 100 has been irradiated with the laser beams 58 in the workpiece 100 is the direction along which the focal points 59 of the laser beams 58 have been relatively moved in the workpiece 100 in the laser beam irradiation step 1011, that is, a direction parallel to the specific crystal orientation (in the first embodiment, crystal orientation [010]) that is parallel to the upper surface 101 of the workpiece 100 and is included in the crystal orientation <100>.

The light source 20 irradiates the whole of the upper surface 101 of the workpiece 100 held by the holding table 10 with light 25 with such a wavelength as to be transmitted through the workpiece 100 and reflect at the crack. As the light source 20, for example, a halogen light that emits an infrared ray, a light emitting diode that emits an infrared ray with a wavelength of 1450 nm, or the like is used. In the first embodiment, the light source 20 is disposed at such a position as to irradiate the whole of the upper surface 101 of the workpiece 100 with the light 25 from a direction parallel to the X-axis direction of the inspection apparatus 1. That is, the light source 20 is disposed at such a position as to be capable of irradiating the upper surface 101 of the workpiece 100 with the light 25 at a predetermined angle of incidence from a direction that includes the processing feed direction, which is the direction along which the workpiece 100 has been irradiated with the laser beams 58, and is parallel to a plane perpendicular to the upper surface 101 of the workpiece 100 through alignment of the processing feed direction with the X-axis direction of the inspection apparatus 1 in the workpiece 100 held by the holding table 10 as described above. Here, the predetermined angle of incidence is, for example, at least 20 degrees and at most 70 degrees in the first embodiment.

The light receiving unit 30 receives reflected light 35 arising from irradiation of the whole of the upper surface 101 of the workpiece 100 by the light source 20 and reflection by the cracks included in the separation layer 110. In the first embodiment, the light receiving unit 30 is disposed opposed to a central region of the upper surface 101 of the workpiece 100 held by the holding table 10 and has a receiving field of view that covers the whole of the upper surface 101 of the workpiece 100 held by the holding table 10 and can acquire the intensity distribution of the reflected light 35 from the cracks included in the whole surface of the separation layer 110 of the workpiece 100 held by the holding table 10 by one time of light reception processing. Here, the intensity distribution of the reflected light 35 from the cracks included in the whole surface of the separation layer 110 of the workpiece 100 held by the holding table 10 is data in which the position at which the reflected light 35 is received and the intensity of the reflected light 35 are associated with each other. Furthermore, in the intensity distribution of the reflected light 35 from the cracks included in the whole surface of the separation layer 110 of the workpiece 100 held by the holding table 10, the positions at which the reflected light 35 is received are represented by the respective positions projected onto the upper surface 101 of the workpiece 100 held by the holding table 10 and include the whole of the upper surface 101 of the workpiece 100 held by the holding table 10. Hereinafter, the intensity distribution of the reflected light 35 from the cracks included in the whole surface of the separation layer 110 of the workpiece 100 held by the holding table 10 will be referred to as the intensity distribution of the whole surface of the reflected light 35 as appropriate.

For example, the light receiving unit 30 includes an imaging element that images the whole of the upper surface 101 of the workpiece 100 held by the holding table 10. The imaging element is a charge-coupled device (CCD) imaging element or a complementary MOS (CMOS) imaging element, for example. The light receiving unit 30 can acquire an image 200 (see FIG. 9) of the intensity distribution of the whole surface of the reflected light 35. In the first embodiment, the image 200 is represented with luminance according to the height of the intensity of the reflected light 35. That is, a position at which the intensity of the reflected light 35 is higher is represented with higher luminance and a position at which the intensity of the reflected light 35 is lower is represented with lower luminance.

The determining unit 40 determines the state of the separation layer 110 on the basis of the intensity of the reflected light 35 received by the light receiving unit 30. The determining unit 40 is electrically connected to the light receiving unit 30 in such a manner as to be capable of information communication. The determining unit 40 acquires the intensity distribution of the whole surface about the reflected light 35 from the light receiving unit 30 and determines the state of the separation layer 110 regarding each position projected onto the upper surface 101 of the workpiece 100 held by the holding table 10 on the basis of this intensity distribution.

As illustrated in FIG. 8, the intensity of the reflected light 35 received by the light receiving unit 30 changes according to the state of the separation layer 110 of the workpiece 100. A in FIG. 8 indicates the case in which the workpiece 100 has not been processed. In this case, there is nothing that reflects the light 25 from the light source 20 inside the workpiece 100 and therefore the intensity of the reflected light 35 received by the light receiving unit 30 is very weak. B in FIG. 8 indicates the case in which the workpiece 100 has been irradiated with the laser beams 58 and the separation layer 110 including the modified layers and the cracks has been formed but the adjacent cracks of the modified layers do not connect to each other. In this case, the part at which the cracks do not connect to each other does not reflect the light 25 although the cracks inside the workpiece 100 reflect the light 25. Therefore, the intensity of the reflected light 35 received by the light receiving unit 30 is comparatively weak.

C in FIG. 8 indicates the case in which the workpiece 100 has been irradiated with the laser beams 58 and the separation layer 110 including the modified layers and the cracks has been formed and the adjacent cracks of the modified layers connect to each other but separation has not occurred. In this case, the cracks inside the workpiece 100 and the part at which the cracks connect to each other reflect the light 25. Therefore, the intensity of the reflected light 35 received by the light receiving unit 30 is comparatively strong. D in FIG. 8 indicates the case in which the workpiece 100 has been irradiated with the laser beams 58 and the separation layer 110 including the modified layers and the cracks has been formed and the adjacent cracks of the modified layers connect to each other and separation has occurred. In this case, the part at which the separation has occurred inside the workpiece 100 strongly reflects the light 25. Therefore, the intensity of the reflected light 35 received by the light receiving unit 30 is very strong.

In particular, the intensity of the reflected light 35 greatly differs between the case in which the cracks connect to each other but separation has not occurred in the separation layer 110 and the case in which separation has occurred in the separation layer 110, and the intensity of the reflected light 35 becomes higher in the latter. When the cracks connect to each other but separation has not occurred, only a very small gap of, for example, approximately 1 μm or smaller exists between the side including the lower surface 102 of the workpiece 100 (ingot side) and the side including the upper surface 101 (wafer side) and this gap is smaller than the wavelength of the light 25 of the light source 20. Thus, the light 25 transmitted through the crack occurs. On the other hand, when separation has occurred, a gap of, for example, approximately 5 μm to 20 μm is made between the side including the lower surface 102 of the workpiece 100 (ingot side) and the side including the upper surface 101 (wafer side) and this gap is filled with air or water. Thus, the light 25 of the light source 20 completely reflects to become the reflected light 35 without being transmitted through this gap.

As above, the intensity of the reflected light 35 received by the light receiving unit 30 changes according to the state of the separation layer 110 of the workpiece 100. Thus, by using this, the determining unit 40 can determine the state of the separation layer 110 on the basis of the intensity of the reflected light 35 received by the light receiving unit 30. In the determining unit 40, the intensity of the reflected light 35 corresponding to the boundary between B and C in FIG. 8 is registered as a first predetermined value 41 in advance. Furthermore, the intensity of the reflected light 35 corresponding to the boundary between C and D in FIG. 8 is registered as a second predetermined value 42 in advance, and the intensity of the reflected light 35 corresponding to the boundary between A and B in FIG. 8 is registered as a third predetermined value 43 in advance. The first predetermined value 41 is smaller than the second predetermined value 42 and is larger than the third predetermined value 43. The second predetermined value 42 is larger than the first predetermined value 41 and is larger than the third predetermined value 43. The third predetermined value 43 is smaller than the first predetermined value 41 and is smaller than the second predetermined value 42. The first predetermined value 41, the second predetermined value 42, and the third predetermined value 43 change also depending on the irradiation intensity, the irradiation condition, and so forth of the light 25 of the light source 20 and change also depending on the condition of reception of the reflected light 35 by the light receiving unit 30 and so forth. Thus, these predetermined values are investigated with use of the following samples prepared in advance, specifically a sample of the workpiece 100 that has not been processed, a sample of the workpiece 100 in which the separation layer 110 has been formed but the cracks do not connect to each other, a sample of the workpiece 100 in which the cracks connect to each other but separation has not occurred, and a sample of the workpiece 100 in which separation has occurred, and are registered in the determining unit 40 in advance.

The determining unit 40 determines the state of the separation layer 110 of the workpiece 100 on the basis of the intensity of the reflected light 35 received by the light receiving unit 30 by using these first predetermined value 41, second predetermined value 42, and third predetermined value 43 registered in advance. The determining unit 40 determines whether or not the adjacent cracks of the separation layer 110 connect to each other depending on whether or not the intensity of the reflected light 35 is larger than the first predetermined value 41. That is, the first predetermined value 41 is the criterion of the determination of whether or not the adjacent cracks of the separation layer 110 have been formed to connect to each other. Furthermore, the determining unit 40 determines whether or not a wafer has been separated from the workpiece 100 with the separation layer 110 being the point of origin depending on whether or not the intensity of the reflected light 35 is larger than the second predetermined value 42. That is, the second predetermined value 42 is the criterion of the determination of whether or not a wafer has been separated from the workpiece 100 with the separation layer 110 being the point of origin. The determining unit 40 determines whether or not processing to form the separation layer 110 (for example, laser processing of the separation layer forming step 1001) has been executed depending on whether or not the intensity of the reflected light 35 is larger than the third predetermined value 43. That is, the third predetermined value 43 is the criterion of the determination of whether or not processing to form the separation layer 110 has been executed.

The cover that is not illustrated is disposed to cover the holding table 10, the light source 20, and the light receiving unit 30 and is formed of a material that blocks light from the external. By blocking light from the external, the cover that is not illustrated can enhance the accuracy of the intensity of the reflected light 35 received by the light receiving unit 30 and enhance the accuracy of the determination of the state of the separation layer 110 of the workpiece 100 by the determining unit 40.

The display unit that is not illustrated is disposed on the cover that is not illustrated in the inspection apparatus 1 with the display surface side oriented outward, and displays the image 200 of the intensity distribution of the whole surface about the reflected light 35 acquired by the light receiving unit 30 of the inspection apparatus 1, an image that represents a determination result by the determining unit 40 on the basis of this intensity distribution, or the like in such a manner that the operator can visually recognize it. The display unit includes a liquid crystal display device or the like. For the display unit, an input unit used when the operator inputs command information or the like relating to various operations of the inspection apparatus 1, the irradiation condition of the light 25, the reception condition of the reflected light 35, display of an image, and so forth is disposed. The input unit disposed for the display unit includes at least one of a touch panel disposed on the display unit, a keyboard, and so forth. The display unit does not need to be fixed to the inspection apparatus 1 and may be disposed in any communication equipment and the communication equipment may be connected to the inspection apparatus 1 in a wireless or wired manner.

The inspection apparatus 1 according to the first embodiment includes a controller that is not illustrated. The controller of the inspection apparatus 1 controls operation of the respective constituent elements of the inspection apparatus 1 and causes the inspection apparatus 1 to execute the irradiation step 1002, the light reception step 1003, and the determination step 1004. In the first embodiment, the controller of the inspection apparatus 1 includes a computer system. The computer system included in the controller of the inspection apparatus 1 has a calculation processing device having a microprocessor like a central processing unit (CPU), a storing device having a memory like a read only memory (ROM) or random access memory (RAM), and an input-output interface device. The calculation processing device of the controller of the inspection apparatus 1 executes calculation processing according to a computer program stored in the storing device of the controller of the inspection apparatus 1 and outputs a control signal for controlling the inspection apparatus 1 to the respective constituent elements of the inspection apparatus 1 through the input-output interface device of the controller of the inspection apparatus 1. In the first embodiment, functions of the determining unit 40 are implemented through execution of a computer processing stored in the storing device by the calculation processing device of the controller of the inspection apparatus 1.

As illustrated in FIG. 7, the inspection apparatus 1-2 according to the first embodiment is what is obtained by increasing the number of light sources 20 to at least two (in the example illustrated in FIG. 7, two) in the inspection apparatus 1 according to the first embodiment, and the other configuration is the same. The inspection apparatus 1-2 according to the first embodiment can increase the light amount of the light 25 because there are multiple light sources 20 as above. In addition, the uniformity of the light 25 with which the whole of the upper surface 101 of the workpiece 100 is irradiated improves and therefore the light amount of the reflected light 35 received by the light receiving unit 30 can be increased. In addition, the uniformity of the reflected light 35 from the cracks included in the whole surface of the separation layer 110 of the workpiece 100 can be improved. This can enhance the accuracy of the determination of the state of the separation layer 110 of the workpiece 100 by the determining unit 40.

The irradiation step 1002 is a step of irradiating the whole of the upper surface 101 of the workpiece 100 in which the separation layer 110 has been formed with the light 25 with such a wavelength as to be transmitted through the workpiece 100 and reflect at the crack of the separation layer 110 as illustrated in FIG. 6 and FIG. 7. In the irradiation step 1002, first, the controller of the inspection apparatus 1 or 1-2 conveys the workpiece 100 onto the holding table 10 by a conveying unit that is not illustrated and so forth and holds the workpiece 100 by the holding table 10. In the irradiation step 1002, next, the controller of the inspection apparatus 1 or 1-2 aligns the processing feed direction that is the direction along which the workpiece 100 has been irradiated with the laser beams 58 with the X-axis direction of the inspection apparatus 1 in the workpiece 100 held by the holding table 10 through rotating the holding table 10 around the Z-axis by the rotational drive source, or the like.

In the irradiation step 1002, then, in the first embodiment, the controller of the inspection apparatus 1 or 1-2 irradiates the whole of the upper surface 101 of the workpiece 100 with the light 25 by the light source 20 from a direction parallel to the X-axis direction of the inspection apparatus 1 as illustrated in FIG. 6 and FIG. 7. The irradiation step 1002 irradiates the upper surface 101 of the workpiece 100 with the light 25 at the predetermined angle of incidence from the direction that includes the processing feed direction and is parallel to a plane perpendicular to the upper surface 101 of the workpiece 100 as above. Thus, a flicker of the reflected light 35 that is light arising from reflection of the light 25 by the crack can be suppressed and the reflected light 35 received by the light receiving unit 30 in the light reception step 1003 to be subsequently executed can be made clearer.

The light reception step 1003 is a step of receiving the reflected light 35 resulting from irradiation in the irradiation step 1002 and reflection by the crack. In the light reception step 1003, the controller of the inspection apparatus 1 or 1-2 receives, by the light receiving unit 30, the reflected light 35 resulting from irradiation of the whole of the upper surface 101 of the workpiece 100 held by the holding table 10 by the light source 20 and reflection by the crack included in the separation layer 110 to acquire the intensity distribution of the whole surface about the reflected light 35 as illustrated in FIG. 6 and FIG. 7.

The determination step 1004 is a step of determining the state of the separation layer 110 on the basis of the intensity of the reflected light 35 received in the light reception step 1003. In the determination step 1004, the determining unit 40 determines whether or not the adjacent cracks of the separation layer 110 connect to each other depending on whether or not the intensity of the reflected light 35 received in the light reception step 1003 is larger than the first predetermined value 41. Furthermore, in the determination step 1004, the determining unit 40 determines whether or not a wafer has been separated from the workpiece 100 with the separation layer 110 being the point of origin depending on whether or not the intensity of the reflected light 35 received in the light reception step 1003 is larger than the second predetermined value 42. Moreover, in the determination step 1004, the determining unit 40 determines whether or not processing to form the separation layer 110 has been executed depending on whether or not the intensity of the reflected light 35 is larger than the third predetermined value 43.

In the determination step 1004, for example, when having acquired the image 200 illustrated in FIG. 9 as the intensity distribution of the whole surface about the reflected light 35 in the light reception step 1003, the determining unit 40 determines that a region 201 in which the intensity of the reflected light 35 is larger than the first predetermined value 41 and is smaller than the second predetermined value 42 is a region in which the adjacent cracks of the separation layer 110 connect to each other, and determines that a region 202 in which the intensity of the reflected light 35 is larger than the second predetermined value 42 is a region in which a wafer has been separated from the workpiece 100 with the separation layer 110 being the point of origin. Thus, the determining unit 40 determines that the state of the separation layer 110 is the state in which the cracks connect to each other or the wafer has been separated in the whole surface of the separation layer 110 of the workpiece 100, that is, the state of the separation layer 110 is the state in which at least the cracks connect to each other in the whole surface of the separation layer 110 of the workpiece 100.

In the inspection method of a workpiece according to the first embodiment, when the determining unit 40 determines that the state of the separation layer 110 is the state in which at least the cracks connect to each other in the whole surface of the separation layer 110 of the workpiece 100 in the determination step 1004 (YES in a step 1005 in FIG. 3) as above, the processing is advanced to the separation step 1006 and the separation step 1006 of giving an external force to the workpiece 100 and separating a wafer from the workpiece 100 with the separation layer 110 being the point of origin is executed. On the other hand, in the inspection method of a workpiece according to the first embodiment, when the determining unit 40 determines that the state of the separation layer 110 is not the state in which at least the cracks connect to each other in at least part of the separation layer 110 of the workpiece 100 in the determination step 1004 (NO in the step 1005 in FIG. 3), the processing is ended and the operator is urged to review the processing from the separation layer forming step 1001, for example.

The separation step 1006 is a step of giving an external force to the workpiece 100 and separating a wafer from the workpiece 100 with the separation layer 110 being the point of origin. In the first embodiment, the external force is ultrasonic vibration given by separating apparatus 60 to be described later, for example. However, the external force is not limited thereto in the present invention and may be any force as long as it is possible to separate a wafer from the workpiece 100 with the separation layer 110 being the point of origin.

Figure 10:
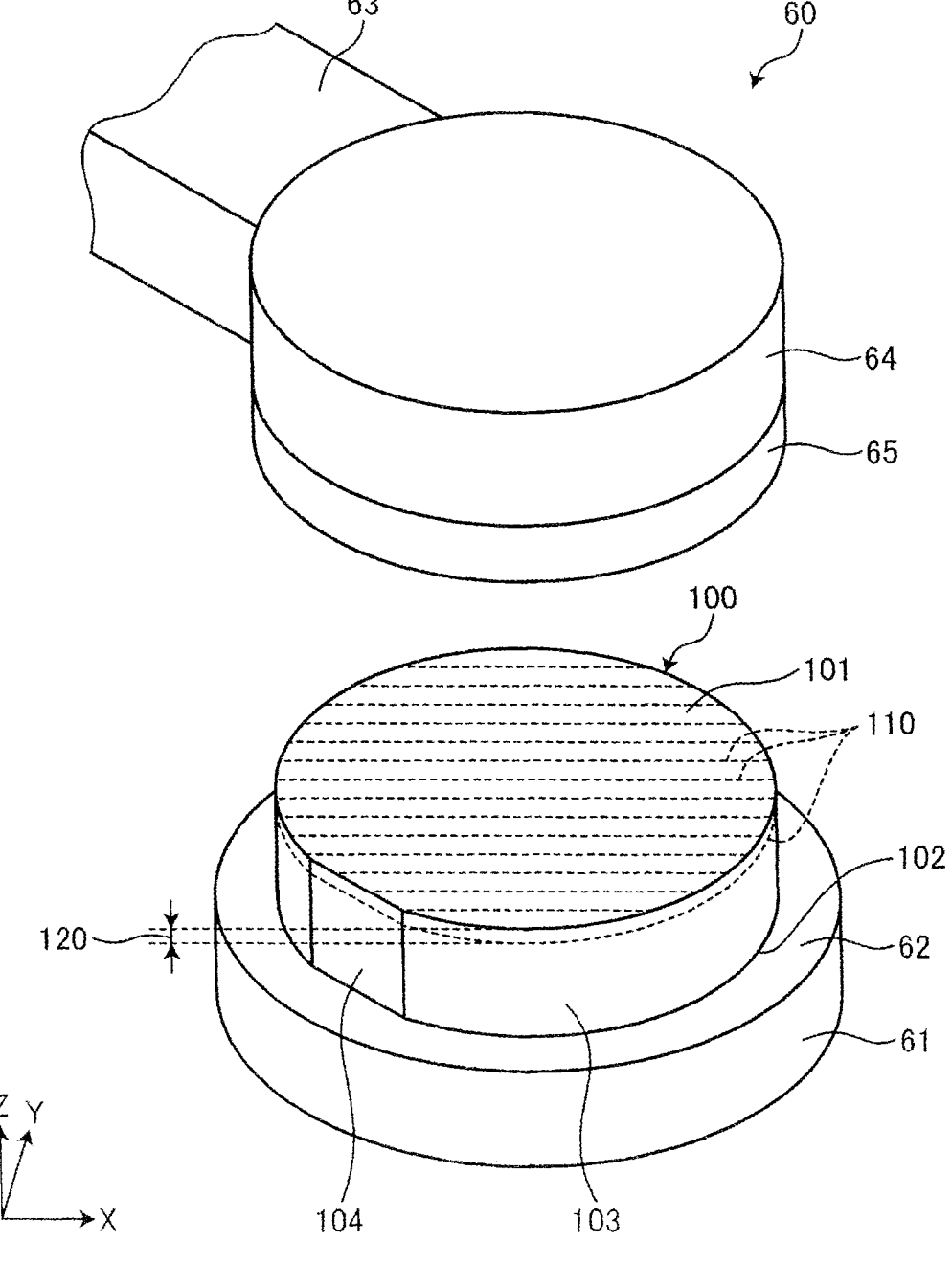
FIG. 10 is a perspective view illustrating a separation step in FIG. 3.
Figure 11:
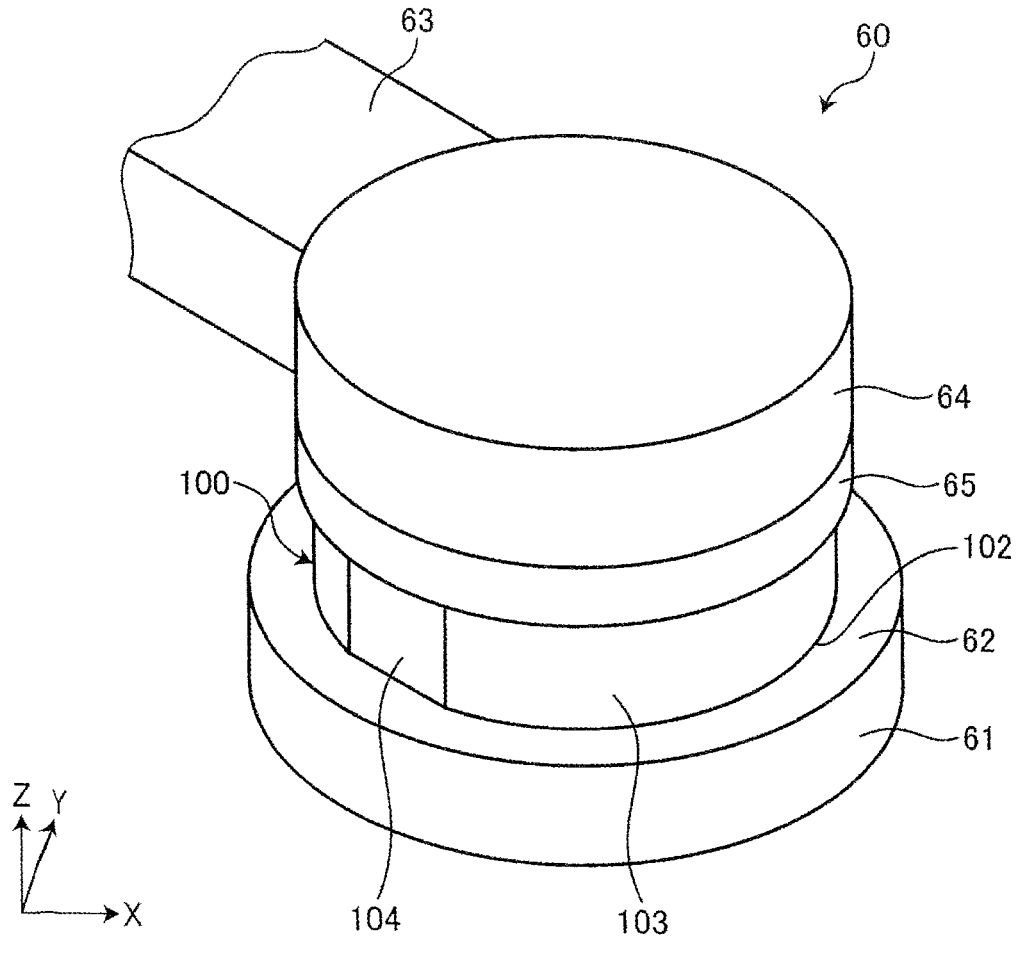
FIG. 11 is a perspective view illustrating the separation step in FIG. 3.

FIG. 10 and FIG. 11 are perspective views for explaining the separation step 1006 in FIG. 3. In the first embodiment, the separation step 1006 is executed by the separating apparatus 60 illustrated in FIG. 10 and FIG. 11. As illustrated in FIG. 10 and FIG. 11, the separating apparatus 60 includes a holding table 61 that holds the workpiece 100 by a holding surface 62, an arm 63, a motor 64, a suction adhesion piece 65 with a circular plate shape, a liquid supply unit that is not illustrated, ultrasonic vibration giving means that is not illustrated, a movement unit that is not illustrated, and a controller that is not illustrated.

For example, the holding table 61 is a chuck table that sucks and holds the workpiece 100 by the holding surface 62 from the side of the lower surface 102 with the side of the upper surface 101 exposed. The arm 63 is formed to horizontally extend. The motor 64 is formed into a circular plate shape and is disposed at the tip of the arm 63. The suction adhesion piece 65 with a circular plate shape is disposed on the lower surface of the motor 64 rotatably around the axial center and causes suction adhesion of the workpiece 100 by the lower surface. The liquid supply unit supplies a liquid to a space between the upper surface 101 of the workpiece 100 and the ultrasonic vibration giving means disposed to face the upper surface 101 of the workpiece 100. The ultrasonic vibration giving means gives, from the lower surface, ultrasonic vibration to the workpiece 100 from the side of the upper surface 101 through the liquid supplied by the liquid supply unit. The movement unit relatively moves the holding table 61 and the workpiece 100 held by the holding table 61 and the arm 63, the motor 64, and the suction adhesion piece 65 along an X-axis direction, a Y-axis direction, and a Z-axis direction. Furthermore, the movement unit relatively moves the holding table 61 and the workpiece 100 held by the holding table 61 and the liquid supply unit and the ultrasonic vibration giving means along the X-axis direction, the Y-axis direction, and the Z-axis direction. The controller of the separating apparatus 60 controls operation of the respective constituent elements of the separating apparatus 60 and causes the separating apparatus 60 to execute the separation step 1006. The controller of the separating apparatus 60 includes a computer system similar to that of the controller of the inspection apparatus 1. The ultrasonic vibration giving means is not limited to this form and may be incorporated in the suction adhesion piece 65 and give ultrasonic vibration from the lower surface of the suction adhesion piece 65.

In the separation step 1006, first, the controller of the separating apparatus 60 conveys the workpiece 100 after execution of the separation layer forming step 1001 onto the holding table 61 by a conveying unit that is not illustrated and so forth and holds the workpiece 100 by the holding table 61 as illustrated in FIG. 10.

In the separation step 1006, next, the controller of the separating apparatus 60 moves, by the movement unit, the ultrasonic vibration giving means to a position at which the lower surface of the ultrasonic vibration giving means faces the upper surface 101 of the workpiece 100 held by the holding table 61. In addition, the controller of the separating apparatus 60 moves the liquid supply unit to a position at which a liquid supply port of the liquid supply unit is oriented toward a space between the upper surface 101 of the workpiece 100 and the lower surface of the ultrasonic vibration giving means. In the separation step 1006, then, while supplying the liquid to the space between the upper surface 101 of the workpiece 100 and the lower surface of the ultrasonic vibration giving means by the liquid supply unit, the controller of the separating apparatus 60 gives ultrasonic vibration to the workpiece 100 from the side of the upper surface 101 by the ultrasonic vibration giving means through the liquid supplied by the liquid supply unit. In the separation step 1006, after the giving of the ultrasonic vibration, the liquid supply unit and the ultrasonic vibration giving means are evacuated from the workpiece 100 held by the holding table 61 by the movement unit.

In the separation step 1006, then, the controller of the separating apparatus 60 moves, by the movement unit, the suction adhesion piece 65 to a position at which the lower surface of the suction adhesion piece 65 gets contact with the upper surface 101 of the workpiece 100 held by the holding table 61 as illustrated in FIG. 11. In the separation step 1006, then, the controller of the separating apparatus 60 causes suction adhesion of the upper surface 101 of the workpiece 100 to the lower surface of the suction adhesion piece 65 and rotates the suction adhesion piece 65 by the motor 64. Due to this, in the separation step 1006, a wafer that includes the upper surface 101 and has a thickness equivalent to the depth 120 can be separated from the workpiece 100 with the separation layer 110 being the point of origin by the ultrasonic vibration previously given and an external force generated due to this rotation.

The separation step 1006 is not limited thereto in the present invention. When the ultrasonic vibration giving means is incorporated in the suction adhesion piece 65, the following way may be employed. The controller of the separating apparatus 60 moves, by the movement unit, the suction adhesion piece 65 to a position at which the lower surface of the suction adhesion piece 65 gets contact with the upper surface 101 of the workpiece 100 held by the holding table 61 as illustrated in FIG. 11. Thereafter, the controller of the separating apparatus 60 causes suction adhesion of the upper surface 101 of the workpiece 100 to the lower surface of the suction adhesion piece 65 by the suction adhesion piece 65, and gives ultrasonic vibration from the lower surface of the suction adhesion piece 65 toward the upper surface 101 of the workpiece 100 by the ultrasonic vibration giving means and rotates the suction adhesion piece 65 by the motor 64. Thereby, a wafer that includes the upper surface 101 and has a thickness equivalent to the depth 120 is separated from the workpiece 100 with the separation layer 110 being the point of origin.

Furthermore, the separation step 1006 is not limited to the form in which the above-described separating apparatus 60 is used in the present invention. For example, the following method may be employed. The workpiece 100 after execution of the separation layer forming step 1001 is immersed and placed in a water tank in which water is sufficiently put, with the side of the upper surface 101 exposed, and ultrasonic waves are oscillated from an ultrasonic oscillation component positioned above the upper surface 101 of the workpiece 100 to stimulate the separation layer 110 by these ultrasonic waves through the water in the water tank. Thereby, a wafer that includes the upper surface 101 and has a thickness equivalent to the depth 120 is separated from the workpiece 100 with the separation layer 110 being the point of origin.

In the inspection method of a workpiece according to the first embodiment, the separation step 1006 is executed based on the determination result of the determination step 1004. However, the configuration is not limited thereto in the present invention. The processing may be ended without executing the separation step 1006 irrespective of the determination result of the determination step 1004.

The inspection method of a workpiece and the pieces of the inspection apparatus 1 and 1-2 according to the first embodiment having the above configuration determine the state of the separation layer 110 inside the workpiece 100 by irradiating the whole of the upper surface 101 of the workpiece 100 with the light 25 with such a wavelength as to be transmitted through the workpiece 100 (Si ingot) and be reflected at the separation layer 110 (crack) and observing the intensity of the reflected light 35 reflected at the separation layer 110. Thus, the inspection method of a workpiece and the pieces of the inspection apparatus 1 and 1-2 according to the first embodiment can determine the state of the separation layer 110 in the whole surface of the separation layer 110 through only irradiating the whole of the upper surface 101 of the workpiece 100 with the light 25 one time. Therefore, it becomes possible to determine the separation layer 110 in a short time without lowering the productivity irrespective of the size of the workpiece 100. Moreover, the inspection method of a workpiece and the pieces of the inspection apparatus 1 and 1-2 according to the first embodiment can determine, based on the intensity of the reflected light 35, the formation status of the separation layer 110, more specifically, whether or not the adjacent cracks connect to each other, whether or not the connected cracks spread and separation has occurred between the ingot side and the wafer side of the workpiece 100, and so forth. This provides operation and effect that the state of the separation layer 110 can be determined without suffering from the influence of a saw mark.

Furthermore, the inspection method of a workpiece and the pieces of the inspection apparatus 1 and 1-2 according to the first embodiment determine whether or not the adjacent cracks of the separation layer 110 have been formed to connect to each other depending on whether or not the intensity of the reflected light 35 is larger than the first predetermined value 41. Thus, whether or not the adjacent cracks connect to each other can be determined efficiently in a short time and accurately without suffering from the influence of a saw mark.

Moreover, the inspection method of a workpiece and the pieces of the inspection apparatus 1 and 1-2 according to the first embodiment determine whether or not a wafer has been separated from the workpiece 100 with the separation layer 110 being the point of origin depending on whether or not the intensity of the reflected light 35 is larger than the second predetermined value 42 larger than the first predetermined value 41. Thus, whether or not separation has occurred between the ingot side and the wafer side of the workpiece 100 can be determined efficiently in a short time and accurately without suffering from the influence of a saw mark.

Furthermore, the inspection method of a workpiece and the pieces of the inspection apparatus 1 and 1-2 according to the first embodiment irradiate the upper surface 101 of the workpiece 100 with the light 25 at the predetermined angle of incidence from the direction that includes the processing feed direction, which is the direction along which irradiation with the laser beams 58 has been executed, and is parallel to a plane perpendicular to the upper surface 101 of the workpiece 100. Thus, a flicker of the reflected light 35 that is light arising from reflection of the light 25 by the crack can be suppressed and the reflected light 35 received by the light receiving unit 30 in the light reception step 1003 to be subsequently executed can be made clearer. Due to this, the determination based on the intensity of the reflected light 35 can be executed more clearly.

Moreover, in the inspection method of a workpiece according to the first embodiment, the separation step 1006 is executed when it is determined that the adjacent cracks of the separation layer 110 connect to each other in the determination step 1004. Thus, separation treatment of a wafer can be efficiently advanced.

Furthermore, in the inspection method of a workpiece according to the first embodiment, in the separation layer forming step 1001, the separation layer 110 including the multiple modified layers and the cracks is formed inside the workpiece 100 by alternately executing the laser beam irradiation step 1011 and the indexing feed step 1012. Thus, the modified layer parallel to the upper surface 101 can be formed in the vicinity of the focal points 59 of the laser beams 58 along multiple lines parallel to the processing feed direction, and the cracks can be extended from the modified layers formed along adjacent lines and be connected to each other. This makes it possible to separate a wafer that includes the upper surface 101 and has a thickness equivalent to the depth 120 from the workpiece 100 by giving a predetermined external force with the separation layer 110 including these modified layers and cracks being the point of origin.

Moreover, the inspection apparatus 1-2 according to the first embodiment includes at least two light sources 20 and thus can increase the light amount of the light 25. In addition, the uniformity of the light 25 with which the whole of the upper surface 101 of the workpiece 100 is irradiated improves and therefore the light amount of the reflected light 35 received by the light receiving unit 30 can be increased. In addition, the uniformity of the reflected light 35 from the cracks included in the whole surface of the separation layer 110 of the workpiece 100 can be improved. This can enhance the accuracy of the determination of the state of the separation layer 110 of the workpiece 100 by the determining unit 40.

Second Embodiment

Figure 12:
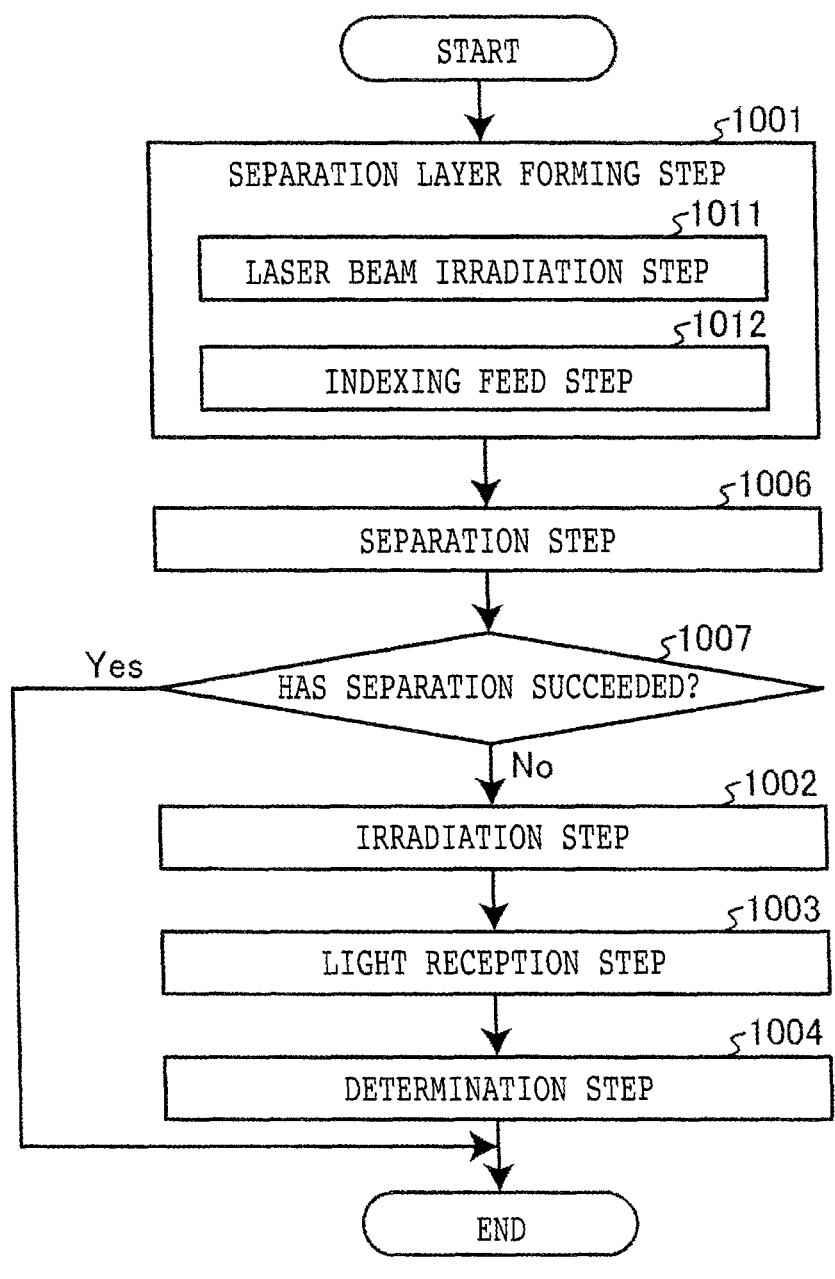
FIG. 12 is a flowchart illustrating the processing procedure of an inspection method of a workpiece according to a second embodiment.

An inspection method of a workpiece according to a second embodiment of the present invention will be described based on a drawing. FIG. 12 is a flowchart illustrating the processing procedure of the inspection method of a workpiece according to the second embodiment. In FIG. 12, the same part as the first embodiment is given the same numeral and description thereof is omitted.

As illustrated in FIG. 12, the inspection method of a workpiece according to the second embodiment is what is obtained by changing the first embodiment as follows. Instead of executing the separation step 1006 when it is determined that the adjacent cracks of the separation layer 110 connect to each other in the determination step 1004, the separation step 1006 is executed after the separation layer forming step 1001 is executed. Then, when separation of a wafer from the workpiece 100 has not succeeded in the separation step 1006 (NO in a step 1007 in FIG. 12), the irradiation step 1002, the light reception step 1003, and the determination step 1004 are executed. The other configuration is the same as the first embodiment.

Even when the separation step 1006 is executed, a wafer cannot be separated from the workpiece 100 in some cases due to the existence of a part at which the separation layer 110 has not been formed in a plane parallel to the upper surface 101 inside the workpiece 100, or the like. In the inspection method of a workpiece according to the second embodiment, when separation of a wafer from the workpiece 100 has not succeeded in the separation step 1006 as above (NO in the step 1007 in FIG. 12), the irradiation step 1002, the light reception step 1003, and the determination step 1004 are executed and, for example, whether or not the wafer has been separated from the workpiece 100 with the separation layer 110 being the point of origin in the determination step 1004. In the inspection method of a workpiece according to the second embodiment, the processing is ended when separation of a wafer from the workpiece 100 has succeeded in the separation step 1006 (YES in the step 1007 in FIG. 12).

In the inspection method of a workpiece according to the second embodiment, after the separation layer forming step 1001 is executed, the separation step 1006 of giving an external force to the workpiece 100 and separating a wafer from the workpiece 100 with the separation layer 110 being the point of origin is executed. Then, when the separation of the wafer from the workpiece 100 has not succeeded in the separation step 1006, the irradiation step 1002, the light reception step 1003, and the determination step 1004 are executed. As above, in the inspection method of a workpiece according to the second embodiment, the irradiation step 1002, the light reception step 1003, and the determination step 1004 are executed only when there is a possibility that a defect has occurred in the separation layer 110. Therefore, the state of the separation layer 110 can be efficiently determined.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An inspection method of a workpiece composed of single-crystal silicon manufactured in such a manner that a specific crystal plane is exposed in each of an upper surface and a lower surface, the inspection method comprising:

a separation layer forming step of forming a separation layer including a modified layer parallel to the upper surface and cracks that extend from the modified layer inside the workpiece through positioning a focal point of a laser beam with a wavelength having transmissibility with respect to the workpiece to a depth equivalent to a thickness of a wafer to be manufactured from the upper surface of the workpiece and executing irradiation with the laser beam while relatively moving the focal point and the workpiece in a processing feed direction;

an irradiation step of irradiating whole of the upper surface of the workpiece in which the separation layer has been formed with light having such a wavelength as to be transmitted through the workpiece and reflect at the crack of the separation layer after the separation layer forming step is executed;

a light reception step of receiving reflected light resulting from the irradiation in the irradiation step and reflection by the crack; and a determination step of determining a state of the separation layer on a basis of intensity of the reflected light received in the light reception step.

2. The inspection method of a workpiece according to claim 1, further comprising:

a separation step of giving an external force to the workpiece and separating the wafer from the workpiece with the separation layer being a point of origin when it is determined that the cracks adjacent in the separation layer connect to each other in the determination step, wherein in the determination step, whether or not the cracks adjacent in the separation layer have been formed to connect to each other is determined depending on whether or not the intensity of the reflected light is larger than a first predetermined value.

3. The inspection method of a workpiece according to claim 2, wherein in the separation layer forming step, the separation layer including a plurality of modified layers and cracks is formed inside the workpiece by alternately executing a laser beam irradiation step of executing irradiation with the laser beam while relatively moving the focal point of the laser beam and the workpiece along a direction parallel to a crystal orientation <100> to form the modified layer parallel to the upper surface and the cracks that extend from the modified layer inside the workpiece, and an indexing feed step of executing indexing feed of the focal point of the laser beam and the workpiece relatively in a direction orthogonal to a direction along which the modified layer has been formed in the laser beam irradiation step.

4. The inspection method of a workpiece according to claim 3, wherein the light with which irradiation is executed in the irradiation step is applied to the upper surface of the workpiece at a predetermined angle of incidence from a direction that includes the processing feed direction and is parallel to a plane perpendicular to the upper surface of the workpiece.

5. The inspection method of a workpiece according to claim 1, further comprising:

a separation step of giving an external force to the workpiece and separating the wafer from the workpiece with the separation layer being a point of origin after the separation layer forming step is executed, wherein the irradiation step, the light reception step, and the determination step are executed again when the separation of the wafer from the workpiece has not succeeded in the separation step.

6. The inspection method of a workpiece according to claim 5, wherein in the determination step, whether or not the wafer has been separated from the workpiece with the separation layer being the point of origin is determined depending on whether or not the intensity of the reflected light is larger than a second predetermined value larger than a first predetermined value that is a criterion of determination of whether or not the cracks adjacent in the separation layer have been formed to connect to each other.

7. An inspection apparatus that inspects a separation layer of a workpiece inside which the separation layer composed of a modified layer and cracks that extend from the modified layer is formed through irradiation of the workpiece composed of single-crystal silicon manufactured in such a manner that a specific crystal plane is exposed in each of an upper surface and a lower surface with a laser beam with a wavelength having transmissibility from a side of the upper surface, the inspection apparatus comprising:

a holding table that holds the workpiece with the side of the upper surface of the workpiece exposed;

a light source that irradiates whole of the upper surface of the workpiece held by the holding table with light having such a wavelength as to be transmitted through the workpiece and reflect at the crack, a light receiving unit that receives reflected light resulting from the irradiation of the whole of the upper surface of the workpiece by the light source and reflection at the crack included in the separation layer, and a determining unit that determines a state of the separation layer on a basis of intensity of the reflected light received by the light receiving unit.

8. The inspection apparatus according to claim 7, wherein the determining unit determines whether or not the cracks adjacent in the separation layer have been formed to connect to each other depending on whether or not the intensity of the reflected light is larger than a first predetermined value.

9. The inspection apparatus according to claim 7, wherein the determining unit determines whether or not a wafer has been separated from the workpiece with the separation layer being a point of origin depending on whether or not the intensity of the reflected light is larger than a second predetermined value larger than a first predetermined value that is a criterion of determination of whether or not the cracks adjacent in the separation layer have been formed to connect to each other.

10. The inspection apparatus according to claim 7, wherein the separation layer including the modified layer parallel to the upper surface and the cracks that extend from the modified layer is formed in the workpiece through irradiation of the workpiece with the laser beam along a direction parallel to a crystal orientation <100>, and the light source is disposed at such a position as to be capable of irradiating the upper surface of the workpiece with the light at a predetermined angle of incidence from a direction that includes a processing feed direction that is the direction along which irradiation with the laser beam has been executed and is parallel to a plane perpendicular to the upper surface of the workpiece.

11. The inspection apparatus according to claim 10, wherein at least two light sources are disposed as the light source.

\* \* \* \* \*